(12) United States Patent
Töpfer

(10) Patent No.: US 6,691,389 B1
(45) Date of Patent: Feb. 17, 2004

(54) CLOSING DEVICE FOR TUBULAR PACKAGES

(75) Inventor: Klaus Töpfer, Büttelborn (DE)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 10/129,673

(22) PCT Filed: Oct. 26, 2000

(86) PCT No.: PCT/EP00/10719

§ 371 (c)(1),
(2), (4) Date: May 7, 2002

(87) PCT Pub. No.: WO01/33970

PCT Pub. Date: May 17, 2001

(30) Foreign Application Priority Data

Nov. 9, 1999 (DE) .......................................... 199 53 694

(51) Int. Cl.$^7$ .............................. B23P 11/00; B23Q 7/10
(52) U.S. Cl. .................... 29/243.57; 29/809; 29/243.56
(58) Field of Search .............................. 29/809, 243.57, 29/243.56, 243.58; 53/138.2, 138.4, 550; 452/148

(56) References Cited

U.S. PATENT DOCUMENTS 4,766,713 A * 8/1988 Evans .......................... 53/138

FOREIGN PATENT DOCUMENTS

| DE | 1 123 588 | 2/1962 | |
|---|---|---|---|
| DE | 2054348 | 5/1972 | |
| DE | 296 13 336 U1 | 10/1996 | ............. B65B/9/15 |

OTHER PUBLICATIONS

DE 1 123 588, Feb. 8, 1962, translation of claim 1.
DE 296 13 336, May 10, 1972, translation of claim 1.
DE 2 054 348, Oct. 31, 1996, translation of claim 1.

* cited by examiner

Primary Examiner—John C. Hong
(74) Attorney, Agent, or Firm—Norris McLaughlin & Marcus

(57) ABSTRACT

The invention relates to a device for closing for example the ends of a sausage that have been gathered to a tress, especially by means of a metal closing clip. The inventive closing device comprises a matrix (3) and a tap device (4) that can be displaced from a rest position in which they are located outside the space occupied by the sausage (30), towards each other into an operative position at the tress (32). A magazine (23) is provided in the path of displacement of the tappet (13) and can be filled with closing clips that are continuously fed. Said stationary magazine (23) interferes with the advance path of the tappet (13) close to the delivery opening of the tappet device (4) only when said tappet device (4) is in the rest position, thereby requiring only a short travel of the pneumatic cylinder. The clip magazine does not have to travel to the operative position of the tappet device.

6 Claims, 5 Drawing Sheets

CLOSING DEVICE FOR TUBULAR PACKAGES

This is a 371 of PCT/EP00/10719 filed Oct. 26, 2000 (international filing date).

This invention relates to a device for closing tubular packages, which—such as sausage ends—are gathered to a tress in the closing area, by means of a plastically deformable, in particular metallic closure clip, comprising a matrix and a tappet device which can be moved from a rest position, in which they are located outside the space occupied by the filled package, towards each other into an operative position at the tress, and comprising a magazine for supplying closure clips into the advance path of a tappet movable in the tappet device.

BACKGROUND OF THE INVENTION

Such closing devices, which are usually disposed behind a filling machine for sausages or the like, are well known and have been quite successful. They are regularly provided in the vicinity of crimping elements which form the tress between two successive packages. As soon as the spreaders are spread and have formed the tress, matrix and tappet move towards the tress between the spreaders and close said tress by setting a closure clip; in fact generally by means of two closure clips set at a certain distance, so that between the same the adjacent packages can be separated from each other.

In the prior art, the respective closure clip(s) to be set is(are) usually supplied by the tappet device or by two such tappet devices. For this purpose, the magazine is attached to the tappet device, and due to the limited space between the spreaders (in which space the magazine which at least partly extends parallel to the filling direction cannot be introduced) such that at the drive end it opens into the guiding passage for the respective closure clip to be set and the associated tappet. This results in a correspondingly long advance path for the closure clip and a just as long advance path of the tappet, which in turn leads to a corresponding stroke of the—generally provided—closing cylinder; cf. for instance DE-A-20 54 348.

In the case of a mechanical drive—for instance by a cam plate—the problem is the same, as is made clear by DE-A-1 123 588 (FIG. 4). In the case of a fluidic (generally pneumatic) drive, however, there is in addition a considerable consumption of air, because the size of the cylinder must be adapted to the force required for closing, but the required stroke only is a small part of the above-mentioned total stroke.

SUMMARY OF THE INVENTION

For the solution of this apparatus-related and operative problem, the invention provides—proceeding from the above-described device—that the magazine is stationarily mounted and (only) in the rest position of the tappet device opens into the advance path of the tappet close to the closure clip outlet opening. In its rest position, the tappet device takes the closure clip required for the next operating cycle from the magazine and has it ready in the vicinity of its outlet opening. When the tappet device is subsequently moved towards the tress, the tappet only needs to make a short stroke, in order to fix the closure clip around the tress—by means of the opposing matrix. In the case of a pneumatic tappet drive, the closing cylinder can then be made correspondingly short and be operated in an air-saving way. Moreover, singling the closure clip and providing the same in the vicinity of the point of attachment are already effected during the filling of the package to be closed subsequently, whereby operating time is saved correspondingly.

DETAILED DESCRIPTION

By way of precaution it should be noted at this point that instead of supplying and singling the respective closure clip at the tappet device, this might also be effected at the matrix; in closure clip technology it is known per se to make this arrangement such that a closure clip is provided in the matrix and is closed by the tappet upon inserting the tress. In the case of this 'kinematic reversal', the magazine would have to be stationarily mounted such that in the rest position of the matrix it would be close to its holder for a closure clip; a corresponding mechanism would then be responsible for delivering the singled closure clip to the matrix. The above-described design is, however, preferred.

In general, the feed of the tappet in the tappet device will be effected by means of a fluidically actuated closing cylinder—for instance a pneumatic cylinder. Then, the arrangement can advantageously be made such that in the rest position, by means of a short feed movement, the closing cylinder piston moves a closure clip from its feed position into a stand-by position. This represents the singling of the respective closure clip to be set. On the other hand, in order to keep the closure clip, which still remains in the magazine, in said magazine when the tappet device leaves the rest position, a retaining sheet is preferably disposed at the tappet device, which retaining sheet extends parallel to the path of movement of the tappet device and is shaped corresponding to the same.

To perform the short feed movement of the tappet for the purpose of singling the closure clip, an auxiliary cylinder piston of a smaller diameter, which is coaxial with the closing cylinder piston, is provided in accordance with an embodiment of the invention. What is correspondingly small is the amount of compressed air required for this singling and this movement into the stand-by position. The arrangement may be made such that the auxiliary cylinder piston urges on the closing cylinder piston by means of a piston rod, but is not firmly connected therewith. In this way, the closing cylinder piston is mechanically and operationally free from the auxiliary cylinder piston, and when compressed air is applied to the closing cylinder piston, said auxiliary cylinder piston is automatically returned to its starting position by the same air. The coaxial double-piston arrangement for the above-described long advance path, which is known from DE 37 05 829 C1, has nothing got to do with this.

As mentioned already, it is known in the prior art to effect the movement of the matrix and the tappet device towards the package tress by means of swivel movements, where one after the other first the matrix was swivelled towards the tress and then the tappet device was swivelled towards the tress and the matrix. The actuation was effected by a cam plate. In contrast to this, independently fluidically actuated cylinders are provided in accordance with the invention to effect the swivel movements. This provides for a flexible change of the control times for the closing operation depending on the kind of closure clips to be processed, the diameter of the package, the material of the package, etc.

It is furthermore advantageous to pivotally mount at the side of the matrix a guiding sheet for the tress, which is provided with a funnel-shaped incision, and to bias the same by means of a spring into a tilted position facing the tress with respect to the longitudinal axis of the matrix. When swivelling the matrix towards the tress, the tilted position of the guiding sheet compensates the deviation of the swivel path from the path of a longitudinal movement. The pivotal connection of the guiding sheet with the tappet device provides for the automatic tracking of the guiding sheet at the end of the swivel movement of the tappet device. To further secure the final relative position of the matrix with respect to the tappet device—with the tress caught in the incision of the guiding sheet—it may furthermore be provided that in the operative position at the tress the guiding sheet engages in a slot in the tappet device.

The invention is illustrated by the drawing with reference to an embodiment, in which:

BRIEF DESCRIPTION OF THE DRAWINGS

A carrier 1 suitably attached to the machine column (not shown) serves as mounting base for the various components of the closing device, namely the spreaders 2, the matrix 3 and the tappet device 4 (as well as a separating means not represented in FIG. 1). They are grouped around a central circular opening 5 in the carrier 1 and thus arranged coaxial to the axis 41 of a filling tube 40 of a filling machine for the packages to be closed. FIG. 1 shows a front view of a package in the form of a sausage 30, which is located in the center of the opening 5 and whose tubular packaging casing 31 had been gathered for being closed to a tress 32 and had been closed by means of a closure clip not represented there in greater detail.

The two spreaders 2 (spread condition shown in FIG. 5), which together form a crimping element, are of the kind described in the German patent application 199 34 154.0. FIG. 1 (like FIG. 2) shows the spreaders 2 in the opened condition of their elements, so that they do not impede filling the next package. The matrix 3 and the tappet device 4 are also swivelled to the outside, namely by means of pneumatic cylinders 6 and 7; the same act on swivel sheets 8 and 9, which are mounted on swivel pins 10 and 11 and carry the matrix 3 and the tappet device 4.

Figure 1:
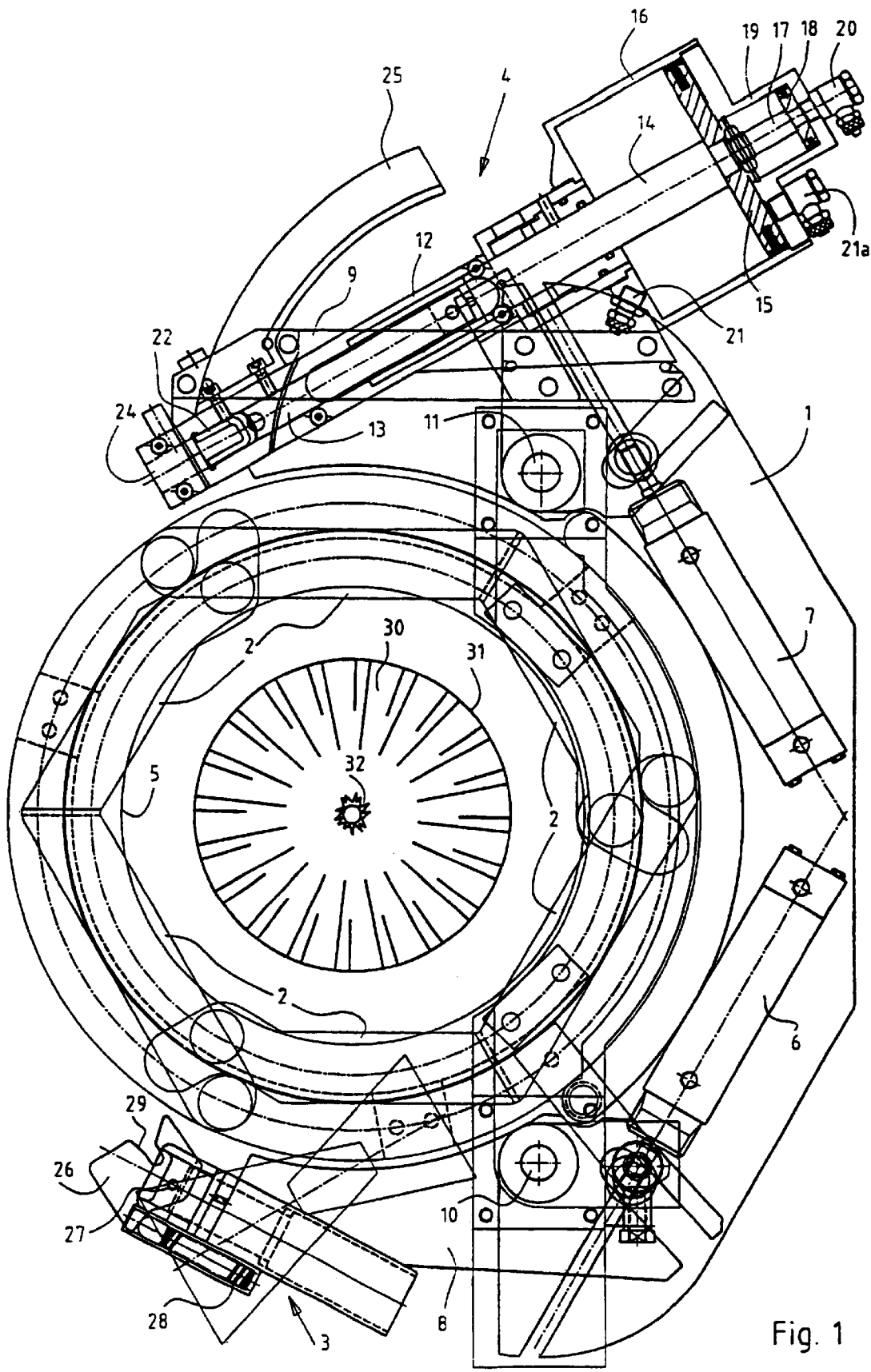
FIG. 1 shows an inventive closing device in a side view (in the rest position at the end of a closing operation)

The tappet device 4 substantially consists of a tappet housing 12, in which the tappet 13 is guided so as to be longitudinally movable. It is connected with the piston rod 14 of the piston 15 of a pneumatic closing cylinder 16. On the side of the closing cylinder piston 15 opposite the piston rod 14 a rod 17 is mounted coaxially, onto which acts— unconnected—the piston 18 of a likewise pneumatic auxiliary cylinder 19, when compressed air is applied to the upper side thereof through the inlet 20.

Figure 2:
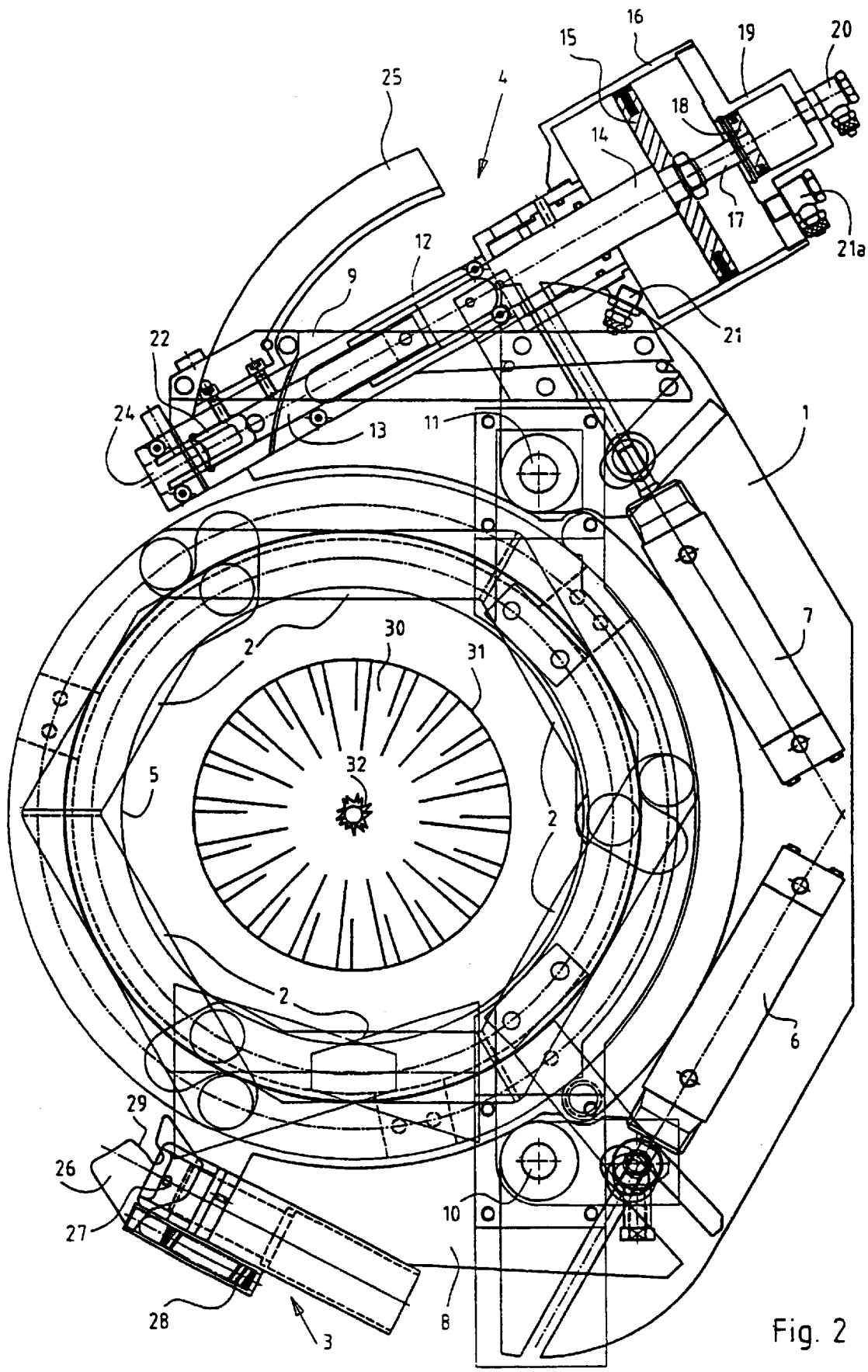
FIG. 2 shows the same side view upon transferring a closure clip into its stand-by position for the next closing operation.

FIG. 1 shows the tappet device in the rest position, which was achieved by introducing compressed air into the inlet 21 below the closing cylinder piston 15; by means of the rod 17, the auxiliary cylinder piston 18 has also been moved back to its initial rest position. In this position, a closure clip 22 from a magazine 23 (FIG. 3) is pushed into the advance path of the tappet 13, namely through an inlet disposed close to the closure clip outlet opening 24 of the tappet housing 12 before the working end of the tappet 13. FIG. 2 illustrates that thereupon compressed air is charged through the inlet 20 to the upper side of the auxiliary cylinder piston 18, so that the same advances the closing cylinder piston 15, until the auxiliary cylinder piston 18 is stopped at a stop at the end of the auxiliary cylinder housing. The movement of the auxiliary cylinder piston 15 moves the tappet 13 in advance direction and thereby moves the closure clip 22 into a position disposed even closer to the closure clip outlet opening 24, which position represents a stand-by position of the closure clip 22 for the subsequent closing operation.

Figure 3:
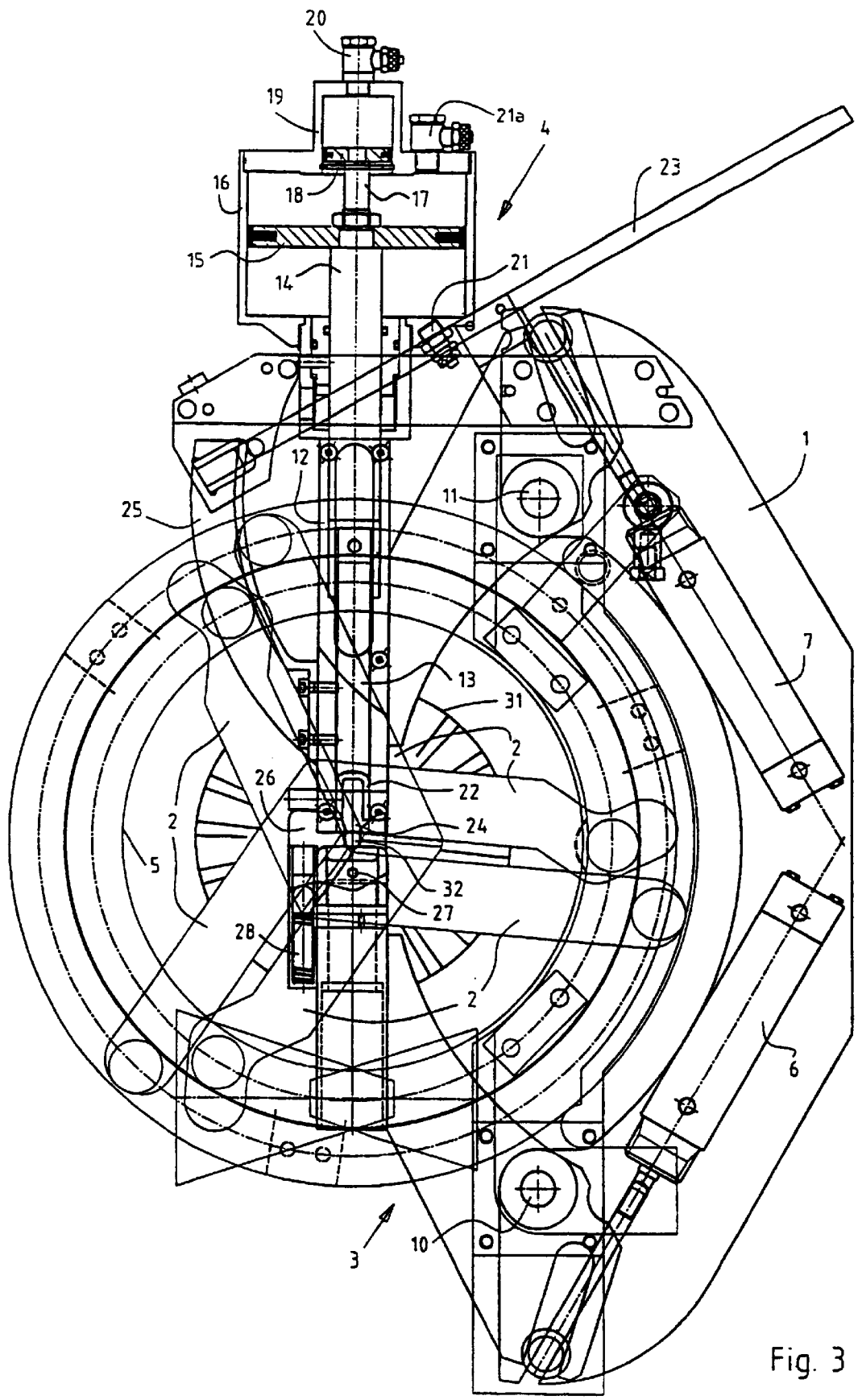
FIG. 3 shows the operating position of the closing device directly before setting the closure clip, in the same side view.
Figure 4:
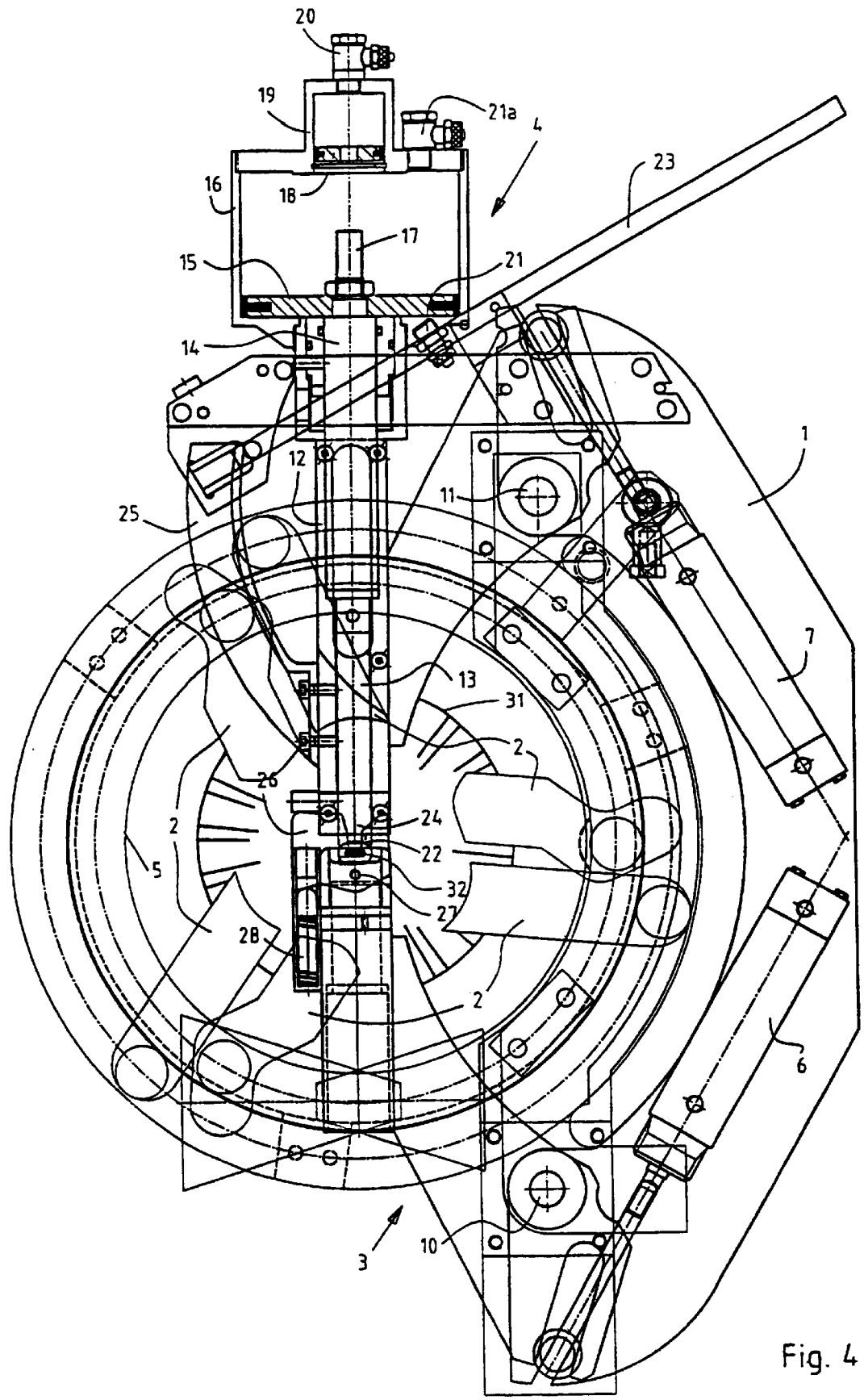
FIG. 4 shows a representation corresponding to FIG. 3 directly after setting the closure clip.
Figure 5:
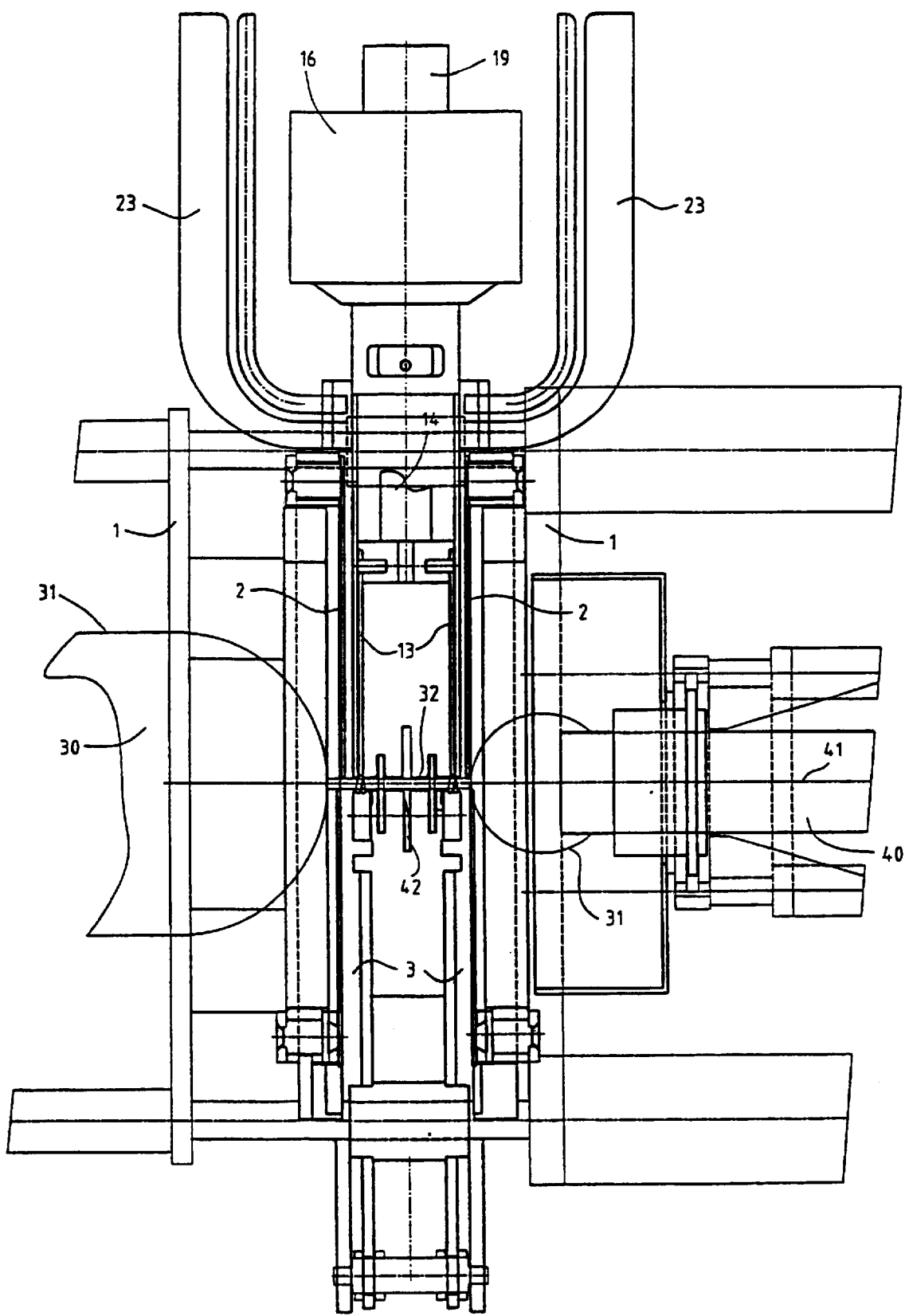
FIG. 5 shows a front view of the closing device.

During the closing operation (upon filling the packaging casing 31 for forming the next sausage 30) the spreaders 2 are put in operation in a known manner and in turn form a tress 32 (FIG. 3) behind the sausage 30, which tress is correspondingly prolonged by spreading both spreaders (FIG. 5). In the space formed thereby, the matrixes 3 and tappet devices 4—each provided in pairs—are swivelled towards the tress 32 by means of the pneumatic cylinders 6, 7; FIG. 3 illustrates this condition. During this swivel movement, a retaining sheet 25 attached to the tappet device and curved corresponding to the swivel movement prevents that the closure clips 22 spring-biased in the stationary magazine 23 are pushed out.

At the side of the matrix 3, which in its working position at the tress 32 bends the two legs of the closure clip 22 around the tress in the usual way, a guiding sheet 26 is mounted so as to be pivoted around a pin 27 and is biased into the tilted position shown in FIGS. 1 and 2 by a spring 28. When the matrix 3 is swivelled towards the tress 32, a funnel-shaped incision 29 of the guiding sheet 26 seizes said tress and fixes its position with respect to the matrix 3 and—by the guiding sheet 26 penetrating into a slot (not shown) in the tappet device 4—also with respect to the tappet device and the closure clip 22 provided by the same. FIG. 3 shows the operating condition reached thereupon. Then, compressed air is charged to the upper side of the closing cylinder piston 15 through the inlet 21a, so that said closing cylinder piston urges the tappet 13 with the required force out of the outlet opening 24 against the matrix 3 and in this way closes the tress 32 of the packaging casing 31.

FIG. 5 illustrates—as has already been mentioned—that both the spreaders and the closing means are provided in pairs in the known way, so that in the spread condition of the spreaders 2 represented in FIG. 5 the two closing means (comprising two matrixes 3 and two tappet devices 4) fix two closure clips 22 at such a distance from each other on the tress 32 that a separating means 42 can cut through the tress 32 between the two closure clips 22.

What is claimed is:

1. Device for closing tube-like packaging, having a closing end which is gathered into a braid, with a closing clamp, comprising a matrix and a tappet device having a tappet movable in a path towards and outlet of the tappet device, the matrix and tappet device being movable from a first position in which they are situated outside a space occupied by a package to be closed, reciprocally into a second position on the braid, and a stationary magazine disposed to supply closing clamps into the path of said movable tappet, wherein the tappet device with the movable tappet is movable relative to the magazine, and the magazine opens in proximity to the path of the movable tappet only when the tappet device is in said first position.

2. The device of claim 1, further comprising a fluid-activated closing cylinder supplying closing clamps from the magazine to the tappet.

3. The device of claim 2, wherein said fluid-activated closing cylinder is adapted to position a closing clamp within said magazine into a position accessible to said tappet.

4. The device of claim 3, further comprising an auxiliary cylinder piston having a smaller diameter than and being coaxial with the piston on said fluid-activated closing cylinder moving said closing clamp into said position accessible to said tappet.

5. The device of claim 4, wherein said auxiliary cylinder piston is adapted to press upon the closing cylinder piston by means of a piston rod, but is not fixedly connected thereto.

6. The device of claim 2, further comprising a retaining plate arranged for the closing clamp in the magazine which extends parallel to the path of the tappet device and is correspondingly shaped.

* * * * *

UNITED STATES PATENT AND TRADEMARK OFFICE
CERTIFICATE OF CORRECTION

PATENT NO. : 6,691,389 B1  
APPLICATION NO. : 10/129673  
DATED : February 17, 2004  
INVENTOR(S) : Topfer It is certified that error appears in the above-identified patent and that said Letters Patent is hereby corrected as shown below:

Title Page Item 57  
Abstract, Line 4, "and a tap device" should read -- and a tappet device --

Title Page Item 57  
Abstract, Line 5, "rest position in" should read -- rest position, in --

Column 2, Lines 50-51, "has nothing got to do with this." should read -- has nothing to do with this. --

Column 4, Line 55, "towards and outlet" should read -- towards an outlet --

Signed and Sealed this

Fifth Day of February, 2008

JON W. DUDAS  
*Director of the United States Patent and Trademark Office*